(12) United States Patent
Jen et al.

(10) Patent No.: US 7,690,263 B2
(45) Date of Patent: Apr. 6, 2010

(54) STRAIN SENSOR AND A METHOD OF MAKING THE SAME

(75) Inventors: Shien-Uang Jen, Taipei (TW);
Wen-Chih Chen, Taipei (TW);
Yuan-Tsung Chen, Taipei (TW);
Yeong-Der Yao, Taipei (TW)

(73) Assignee: Academia Sinica, Taipei (TW)

( * ) Notice: Subject to any disclaimer, the term of this patent is extended or adjusted under 35 U.S.C. 154(b) by 125 days.

(21) Appl. No.: 11/603,863

(22) Filed: Nov. 24, 2006

(65) Prior Publication Data
US 2008/0122572 A1    May 29, 2008

(51) Int. Cl.
*G01L 1/00* (2006.01)
(52) U.S. Cl. .................................................. 73/777
(58) Field of Classification Search ............ 73/777
See application file for complete search history.

(56) References Cited

U.S. PATENT DOCUMENTS

| | | | | |
|---|---|---|---|---|
| 3,137,834 | A * | 6/1964 | Pfann | 338/6 |
| 5,659,139 | A * | 8/1997 | Okada et al. | 73/778 |
| 6,082,200 | A * | 7/2000 | Aslam et al. | 73/774 |
| 6,303,218 | B1 * | 10/2001 | Kamiguchi et al. | 428/332 |
| 6,756,239 | B1 * | 6/2004 | Nickel et al. | 438/3 |
| 6,780,524 | B2 * | 8/2004 | Lin et al. | 428/814 |
| 7,029,771 | B2 * | 4/2006 | Hasegawa et al. | 428/811.5 |
| 7,043,823 | B2 * | 5/2006 | Childress et al. | 29/603.07 |
| 7,116,209 | B2 * | 10/2006 | Hermann et al. | 338/2 |
| 7,256,971 | B2 * | 8/2007 | Horng et al. | 360/324.11 |
| 7,330,339 | B2 * | 2/2008 | Gill | 360/324.11 |
| 7,518,835 | B2 * | 4/2009 | Huai et al. | 360/324.12 |

OTHER PUBLICATIONS

Oleinik, I. I. et al., "Structural and electronic properties of Co/Al$_2$O$_3$/Co magnetic tunnel junction from first principles", *Journal of Magnetism and Magnetic Materials*, vol. 62, No. 6. pp. 3952-3959, 2000.
Otaka, Y. et al., "Evaluation of AlO$_x$ in Co/AlO$_x$/Co spin tunneling junctions by XPS", *Mat. Res. Soc. Symp. Proc.*, vol. 811, Materials Research Society, 2004.

(Continued)

*Primary Examiner*—Lisa M Caputo
*Assistant Examiner*—Octavia Davis
(74) *Attorney, Agent, or Firm*—Finnegan, Henderson, Farabow, Garrett & Dunner, LLP (57) ABSTRACT

A strain sensor is provided including a substrate, and a sensing layer, including cobalt, provided on the substrate. A first electrode is coupled to the sensing layer, and a tunnel layer including aluminum oxide is provided on the sensing layer. In addition, a pinned layer, also including cobalt, is provided on the tunnel layer. An exchange biasing layer is provided on the pinned layer, and a second electrode is coupled to the exchange biasing layer. The strain sensor is configured such that, over a range of values of strain applied to the sensor, a resistance of the sensor is a linear function of the strain. A related method is also disclosed.

11 Claims, 7 Drawing Sheets

OTHER PUBLICATIONS

Urech, M. et al., "Magnetoresistance in Co/AlO$_x$/Co tunnel junction arrays", *Journal of Magnesium and Magnetic Meterials,* 249, pp. 513-518, 2002.

J. J. Brophy, Basic Electronics for Scientists (McGraw-Hill, New York, 1977), p. 301.

S. U. Jen, C. C. Yu, C. H. Liu, and G. Y. Lee, Thin Solid Films 434, 316 (2003).

V. A. Gridchin, V. M. Lubimsky, and M. P. Sarina, Sensors and Actuators A49, 67 (1995).

S. U. Jen, T. C. Wu, and C. H. Liu, J. Magn. Magn. Mater. 256, 54 (2003).

J. C. Slonczewski, Phys. Rev. B 39, 6995 (1989).

R. M. Eisberg, Fundamentals of Modern Physics (Wiley, New York, 1961), p. 231.

S. Chikazumi, Physics of Ferromagnetism (Clarendon Press, Oxford, 1997), p. 376.

Y. T. Chen, S. U. Jen, Y. D. Yao, J. M. Wu, C. C. Lee, and A. C. Sun, IEEE Trans. Magn. 42, 278 (2006).

M. Ali, C. H. Marrows, M. Al-Jawad, B. J. Hickey, A. Misra, U. Nowak, and K. D. Usadel, Phys. Rev. B 68, 214420 (2003).

Y. T. Chen, S. U. Jen, Y. D. Yao, J. M. Wu, J. H. Liao, and T. B. Wu, unpublished.

S. U. Jen, Y. T. Chen, J. M. Wu, W. C. Chen, W. C. Cheng, and Y. D. Yao, Applied Physics Letters 89, 222510 (2006).

D. Wang, C. Nordman, A. Qian, J. M. Daughton, and J. Myers, Journal of Applied Physics 97, 10C906 (2005).

\* cited by examiner

STRAIN SENSOR AND A METHOD OF MAKING THE SAME

BACKGROUND

A strain sensor or gauge measures a strain on an object due to an external force by converting a mechanical strain into an electronic signal. A strain gauge can include a wire, for example, which, when held under tension, becomes slightly longer and has reduced cross-sectional area. Alternatively, if the wire is under compression, it becomes slightly shorter and its cross-sectional area is increased. In both cases, the change in the cross-sectional area leads to a change in resistance of the strain gauge wire.

A strain gauge is characterized by its strain gauge factor, which is a measure of the sensitivity of the gauge to strain. The strain gauge factor $\gamma$ is defined as $$\gamma \equiv \frac{1}{R_o} \frac{\Delta R}{\Delta \varepsilon}. \quad (1)$$

$\Delta R = R - R_o$, where R is the resistance of the gauge wire, when stressed by a strain $\Delta \varepsilon$, and $R_o$ is the unstrained resistance. Usually, if the gauge wire is made of a metal or alloy, the value of $\gamma$ ranges from 2 to 5. If it is made of polysilicon, the value of $|\gamma|$ is larger, about 10 to 150. A linearly proportional relationship between the resistance R and the strain can be observed in gauge wires including metals, alloys, and polysilicon. On the other hand, if the wire is made of a ferromagnetic metal or alloy, a maximum value of $\gamma$, hereafter denoted as $\gamma_{max}$, can be as high as about 150 to 300 either in the positive or the negative $\Delta \varepsilon$ region. However, the relationship between the resistance R and the strain $\Delta \varepsilon$ becomes non-linear in that R does not vary proportionally with respect to the strain $\Delta \varepsilon$. For a strain sensor having a non-linear relationship of the resistance and the strain, additional circuitry may be required for an accurate determination of the applied strain corresponding to the electrical resistance. Therefore, a linear relationship between the resistance R and the strain $\Delta \varepsilon$ is desirable in a strain sensor, in order to obtain an accurate measurement of an applied strain corresponding to a detected resistance value. Since a large maximum strain gauge factor $\gamma_{max}$ and a linear relationship between the resistance R and the strain $\Delta \varepsilon$ are both desirable characteristics of a strain sensor, there is a need for a strain gauge having such characteristics for ultra-sensitive detection of low strain.

SUMMARY OF THE INVENTION

According to one aspect, the present disclosure is directed toward a strain sensor, comprising a substrate, a sensing layer including cobalt provided on the substrate, a first electrode coupled to the sensing layer, a tunnel layer including aluminum oxide provided on the sensing layer, a pinned layer including cobalt provided on the tunnel layer, an exchange biasing layer on the pinned layer, and a second electrode coupled to the exchange biasing layer, wherein, over a range of values of strain applied to the sensor, a resistance of the strain sensor is a linear function of the strain.

According to another aspect, the present disclosure is directed toward a method of making a strain sensor, the method comprising depositing a conductive seed layer on a substrate, depositing a first layer including a ferromagnetic material, depositing a second layer including aluminum, oxidizing the second layer in a first oxidation, oxidizing the second layer in a second oxidation, depositing a third layer including a ferromagnetic material, depositing a fourth layer including an antiferromagnetic material, and depositing a conductive protection layer on the fourth layer.

BRIEF DESCRIPTION OF THE DRAWINGS

The accompanying drawings, which are incorporated in and constitute a part of this specification, provide diagrammatic representation of the disclosed embodiments and together with the description, serve to explain the principles of the invention. In the drawings.

DETAILED DESCRIPTION

Figure 1:
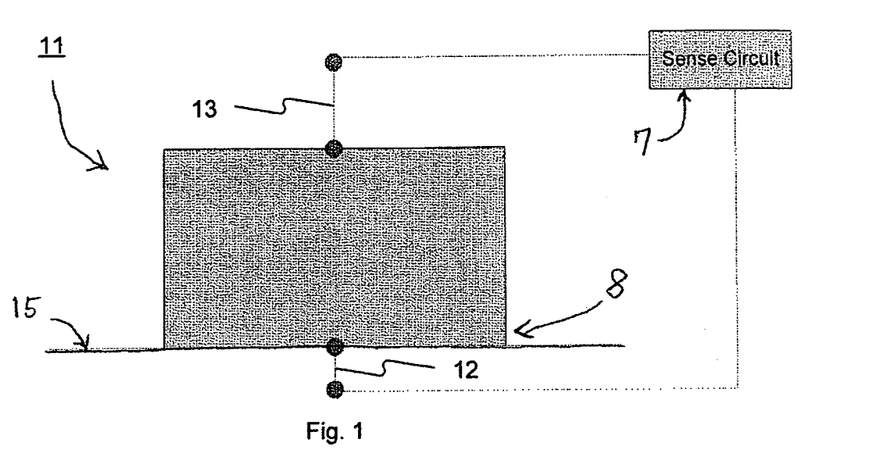
FIG. 1 is a block diagram of a strain gauge in accordance with an exemplary disclosed embodiment.

FIG. 1 provides a block diagram illustration of a strain gauge 11, according to an exemplary disclosed embodiment. Strain gauge 11 includes a portion 8, which includes an MTJ as discussed below, and electrodes 12 and 13. Strain gauge 11 may be provided on a surface 15, which is subjected to a strain force. Externally applied strain to surface 15 can be sensed by measuring a change in electrical resistance associated with strain gauge 11. Electrodes 12 and 13 are configured to pass a current through portion 8. Electrodes 12 and 13 are coupled to sense circuit 7, which detects the current and outputs a reading corresponding to the strain on surface 15.

Figure 2:
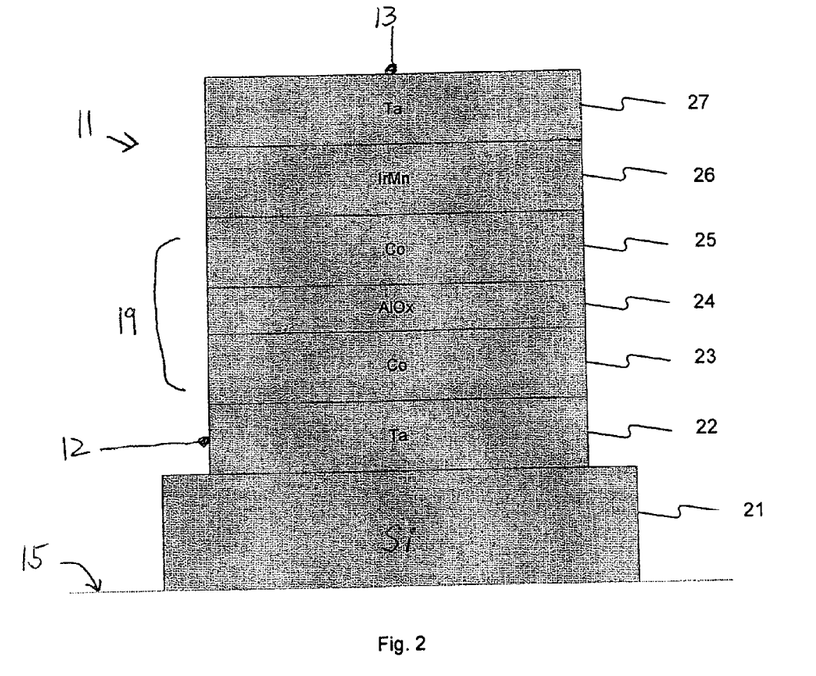
FIG. 2 provides a diagrammatic representation of a cross-sectional view of a magnetic tunnel junction used in a strain gauge in accordance with an exemplary disclosed embodiment.

FIG. 2 illustrates strain gauge 11 in greater detail. Strain gauge 11 includes a substrate 21, which may include a single crystal silicon substrate having a <100> crystallographic orientation or a surface oxidized silicon substrate, upon which a conductive layer 22, such as tantalum, is deposited. Conductive layer 22 is preferably coupled to electrode 12. A first conductive layer 22 may have a thickness of 30 Å, for example. Second conductive layer 23, having a thickness of 75 Å, for example, and preferably including a ferromagnetic material, such as cobalt, is provided on first conductive layer 22. An insulative layer 24, such as AlOx having a thickness of between 12 and 30 Å, for example, is provided on conductive layer 2. The thickness of insulative layer 24 is typically selected so that layer 24 can facilitate tunneling between layers 23 and 25, as discussed in greater detail below.

A third conductive layer 25 is typically provided on insulative layer 24. Third conductive layer 24 is typically made of a ferromagnetic material, such as cobalt, and has a thickness of 75 Å, for example. As discussed in greater detail below, layers 23-25 collectively constitute a magnetic tunnel junction (MTJ) 19.

A fourth conductive layer 26, which, in this example, includes an antiferromagnetic alloy of iridium and manganese (IrMn) is provided on third conductive layer 25 and has a thickness of 90 Å. Fourth conductive layer 26 may be $Ir_{20}Mn_{80}$, for example. Fifth conductive layer 27, including tantalum, for example, is provided on fourth conductive layer 26. Fifth conductive layer 27 is provided to protect the fourth conductive layer 26, in order to prevent oxidation, which may lead to degradation, of the fourth conductive layer 26. Fifth conductive layer 27 typically has a thickness of 100 Å and is coupled to electrode 13.

Before discussing the operation of strain gauge 11, a general description of magnetic tunnel junctions is presented below.

Typically, a magnetic tunnel junction includes an insulative or tunnel layer sandwiched between two magnetic layers. Each of the two ferromagnetic metal layers has an orientation of magnetization, whereby the conduction electrons in each layer have a given spin orientation. This spin orientation can be changed by application of a magnetic field, for example. Typically, in an MTJ, one of the two ferromagnetic metal layers has a pinned orientation of magnetization, which is fixed, while the other ferromagnetic metal layer has a free orientation of magnetization, which may be controlled by applying the magnetic field. When the orientation of magnetization of the two ferromagnetic layers is antiparallel, or in two opposite directions, the resulting tunneling current is small, and thus the electrical resistance is high. This is because fewer energy states are available in the pinned layer to accommodate electrons of opposite spin in the other layer. On the other hand, when the orientation of magnetization of the two ferromagnetic metal layers is parallel in an MTJ, or in a same direction, the resulting tunneling current through the MTJ is relatively high, and the MTJ exhibits a low electrical resistance due to the increased number of energy states for electrons having the same spin. This behavior is known as tunneling magnetoresistance (TMR).

In a typical TMR measurement, electrical resistance of a magnetic tunnel junction is measured in response to an external magnetic field. The resistance R of an MTJ depends on the relative orientation of the pinned spin ($\bar{p}$) with respect to that of the free spin ($\bar{f}$). As a result, R is expressed as, $$(1/R) = T(1 + P^2 \cos\theta), \quad (2)$$

where T is a parameter associated with the quantum tunneling effect, P is the polarization of the ferromagnetic metal layers, and $\theta$ is the angle between $\bar{p}$ and $\bar{f}$. Hence, when there is no applied external field $H_E$, the MTJ is at the high-resistance state, in which $\theta=\pi$. When an external field $H_E$ is applied, the resistance decreases. At a sufficiently high $H_E$, it is at the lowest resistance state, in which $\theta=0$. For reference, the TMR ratio ($\delta R/R_o$) of the MTJ used in the present disclosure is about 45%.

In sum, in conventional MTJs, the spin of conduction electrons can be altered by applying an external magnetic field. Consistent with an aspect of the present disclosure, however, a strain exerted on second conductive layer 22 (i.e., the sensing layer of MTJ 19) changes the orientation of the spin of conduction electrons in this layer, instead of application of an external magnetic field. The strain originates in surface 15 and is transferred to layer 22 through substrate 21, as well as layers 22 and 23. When no strain is applied to surface 15, the spin orientations of conduction electrons in both layers 23 and 25 of MTJ 19 are anti-parallel to each other. As a result a tunnel current cannot flow from layer 23 to layer 25 through insulative or tunnel layer 24. When a strain is applied, however, the spin orientation of electrons in layer 23 changes relative to the spin orientation of electrons in layer 25, and thus the current flowing though MTJ 19 is enhanced. Accordingly, the resistance of MTJ 19 decreases.

When a ferromagnetic material, such as cobalt, is disposed next to an antiferromagnetic material, such as IrMn, an antiferromagnetic exchange coupling force may exist. The resulting interaction between the two adjacent layers create an exchange bias, by which the spin orientation of electrons in the two layers can be controlled. In the present disclosure, a ferromagnetic layer 25 and an antiferromagnetic layer 26 preferably create such an exchange bias, which is used to fix the preferred direction of spin in layer 25.

Figure 3:
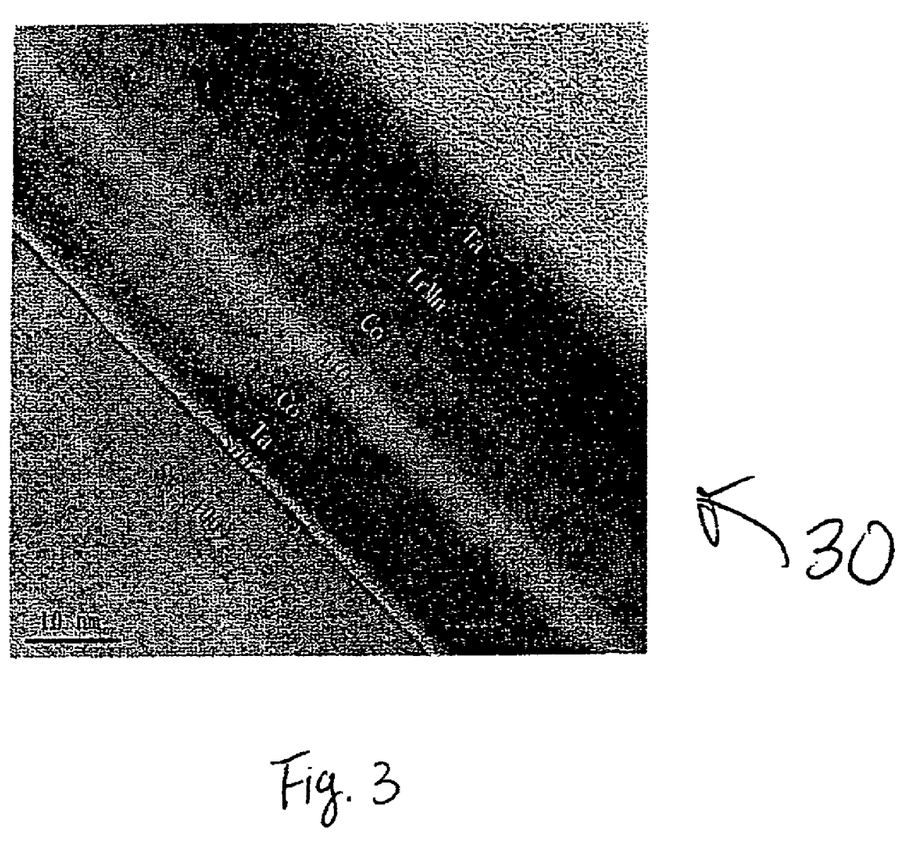
FIG. 3 is a transmission electron micrograph image of an exemplary magnetic tunnel junction consistent with the present disclosure.

FIG. 3 is an image 30 of an exemplary MTJ consistent with MTJ's described above in FIG. 2. A high-resolution transmission electron microscope is used to produce the image of the cross-section of the MTJ shown in FIG. 3.

Figure 4:
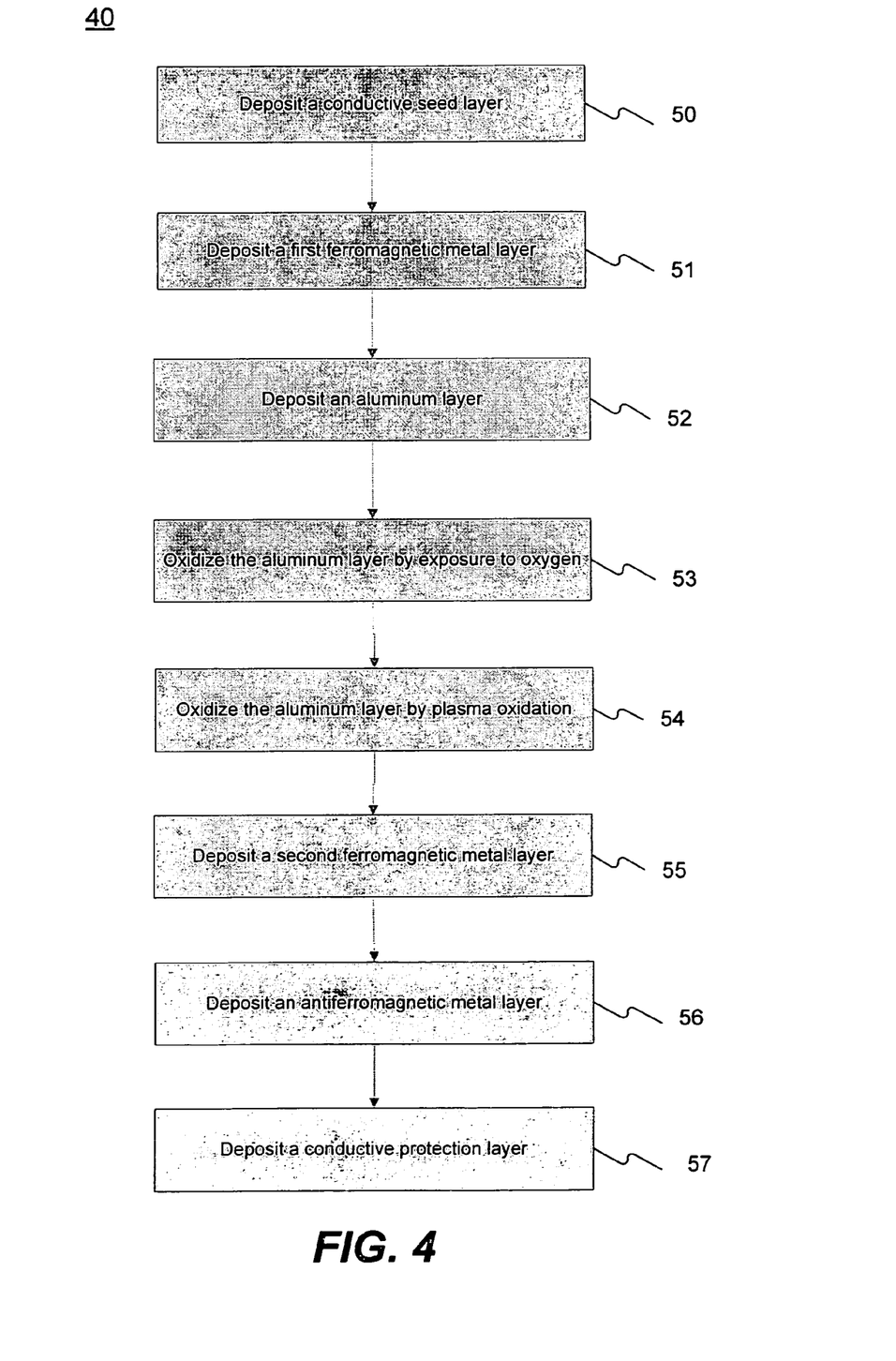
FIG. 4 is a flowchart depicting an exemplary method for making a strain gauge consistent with an aspect of the present disclosure.

FIG. 4 provides a flowchart 40, which illustrates various steps of an exemplary method of making MTJ 19 consistent with a further aspect of the present disclosure. A substrate, such as a silicon or a surface oxidized silicon substrate 21, on which MTJ 19 is to be fabricated, is first provided. In step 50, a conductive seed layer 22 including tantalum is deposited with a thickness of 30 Å on substrate 21. Then, in step 51, a first ferromagnetic layer 23 including Co is deposited on conductive seed layer 22 with a thickness of 75 Å. Next, in step 52, a relatively thin layer of Al, for example, is deposited on second conductive layer 23. Such Aluminum is a precursor for a subsequently formed AlOx insulative layer 24. The thickness of the precursor Al layer may vary. For example, precursor Al layers may have thickness of 12 Å, 17 Å, 22 Å, 26 Å, and 30 Å, respectively.

After deposition of the precursor Al layer on second conductive layer 23, the Al layer is first oxidized in step 53, in which the Al layer is exposed to substantially pure $O_2$ gas for about 80 seconds. During such $O_2$ exposure, the flow rate of the $O_2$ gas during natural oxidation is 100 sccm, for example, and the chamber pressure may be set to $2.1 \times 10^{-1}$ Torr, for example. Thereafter, in step 54, a second oxidation is carried out in which an $Al_2O_3$ target in an Ar and $O_2$ atmosphere is sputtered for 30 to 70 seconds during a plasma oxidation process. The flow rate of the Ar gas is 16 sccm and the flow rate of the $O_2$ gas is 9 sccm, for example. A chamber pressure during sputtering is maintained at, preferably, about $5.2 \times 10^{-2}$ Torr. The resulting oxidized Al layer constitutes the insulating AlOx layer 24. The first and second oxidation processes typically ensure that the underlying layer 23 is properly protected and not oxidized, and that the resulting layer 24 is densely formed.

Thereafter, in step 55, a second ferromagnetic layer 25 with a thickness of 75 Å is deposited, on which an antiferromagnetic layer 26 having a thickness of 90 Å is deposited in step 56. Finally, in step 57, a conductive protection layer of, for example, Ta 27 having a thickness of 100 Å is deposited.

Layers 22, 23, and 25-27 may be deposited at room temperature by magnetron sputtering with a base pressure of, for example, $p=1.5 \times 10^{-7}$ Torr. In addition, an in-plane deposition field of h=500 Oe is applied along one side of the junction during deposition of all the layers in order to induce a preferred easy axis for the free spin $\bar{f}$ and a preferred direction for the pinned spin $\bar{p}$.

After deposition, the Si substrate 21 is cut into a rectangular shape in order to place MTJ 19 at the center of the piece.

An electrode is placed on the junction to measure the tunneling current through MTJ 19. The contact area between the electrode and MTJ 19, through which a probe current is tunneled perpendicularly, is about 0.0225 mm².

Figure 5A:
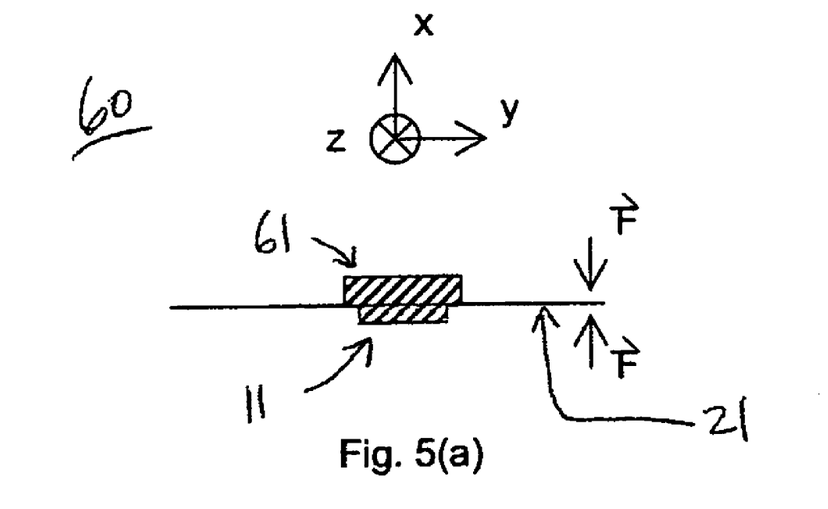
FIGS. 5(a) and 5(b) provide diagrammatic representations of an experiment used to measure the relationship between the resistance (R) and the strain ($\Delta \varepsilon$) of a magnetic tunnel junction (MTJ) in accordance with an exemplary disclosed embodiment.
Figure 5B:
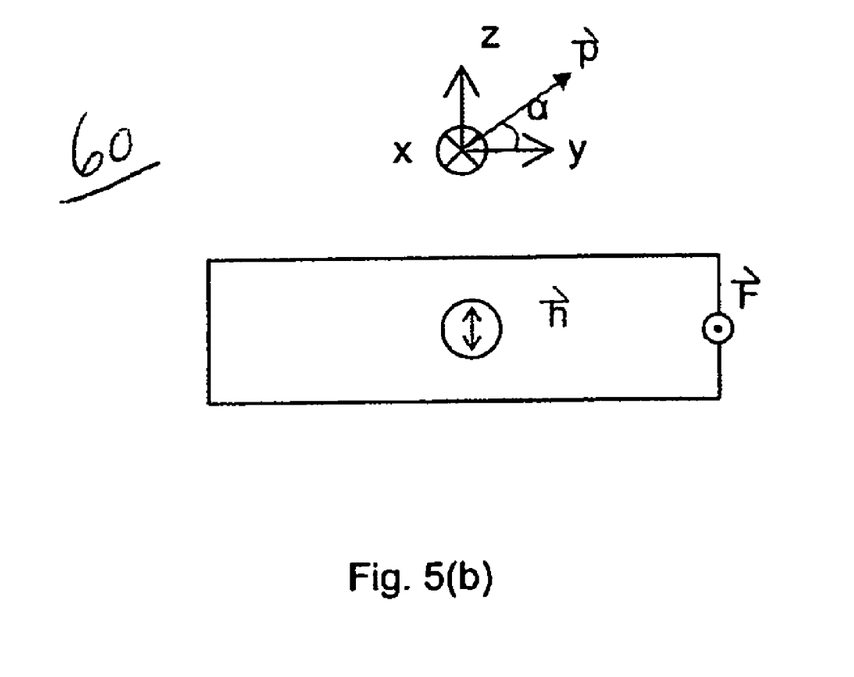

Once MTJ 19 is fabricated by the method disclosed in FIG. 4, the resulting MTJ 19 may be used to determine the relationship between the resistance (R) and the strain Δε. FIG. 5 is a block diagram of an experiment setup 60 used to measure such relationship between the resistance (R) and the strain Δε of MTJ 19. FIG. 5(a) shows a side view of experiment setup 60, and FIG. 5(b) shows a top view of experiment setup 60.

Experimental setup 60 includes a strain sensor (CEA-06-015UW-120 commercially available from Measurements Group, Inc) 61 attached on the opposite side of strain element 11 having substrate 21. The area of strain sensor 61 is 10 times larger than the contact area between the electrode and MTJ 19. An upward force (F<0) or a downward force (F>0) may be applied to strain element 11. When F is not zero, the strain value Δε of strain sensor 61 can be read directly from a commercial strain-gauge indicator (e.g. Model 3800 commercially available). Since MTJ 19 and strain sensor 61 are on opposite sides of substrate 21, if Δε>0, MTJ 19 is under a compressive stress (σ<0), and if Δε<0, MTJ 19 is under a tensile stress (σ>0).

With the testing configuration as shown in FIG. 5, if F≠0, there exists a longitudinal stress ($\bar{\sigma}$), parallel to the y-axis, on MTJ 19. Due to an exchange coupled effect, as discussed later, the angle α between the pinned spin $\bar{p}$, i.e. the both of electrically conductive or pinned layer 25 and the y-axis is typically equal to π/2. That is, since $\bar{p}$ is induced by $\bar{h}$ during deposition, under the zero strain condition, $\bar{p}$ should be parallel to $\bar{h}$.

Figure 6:
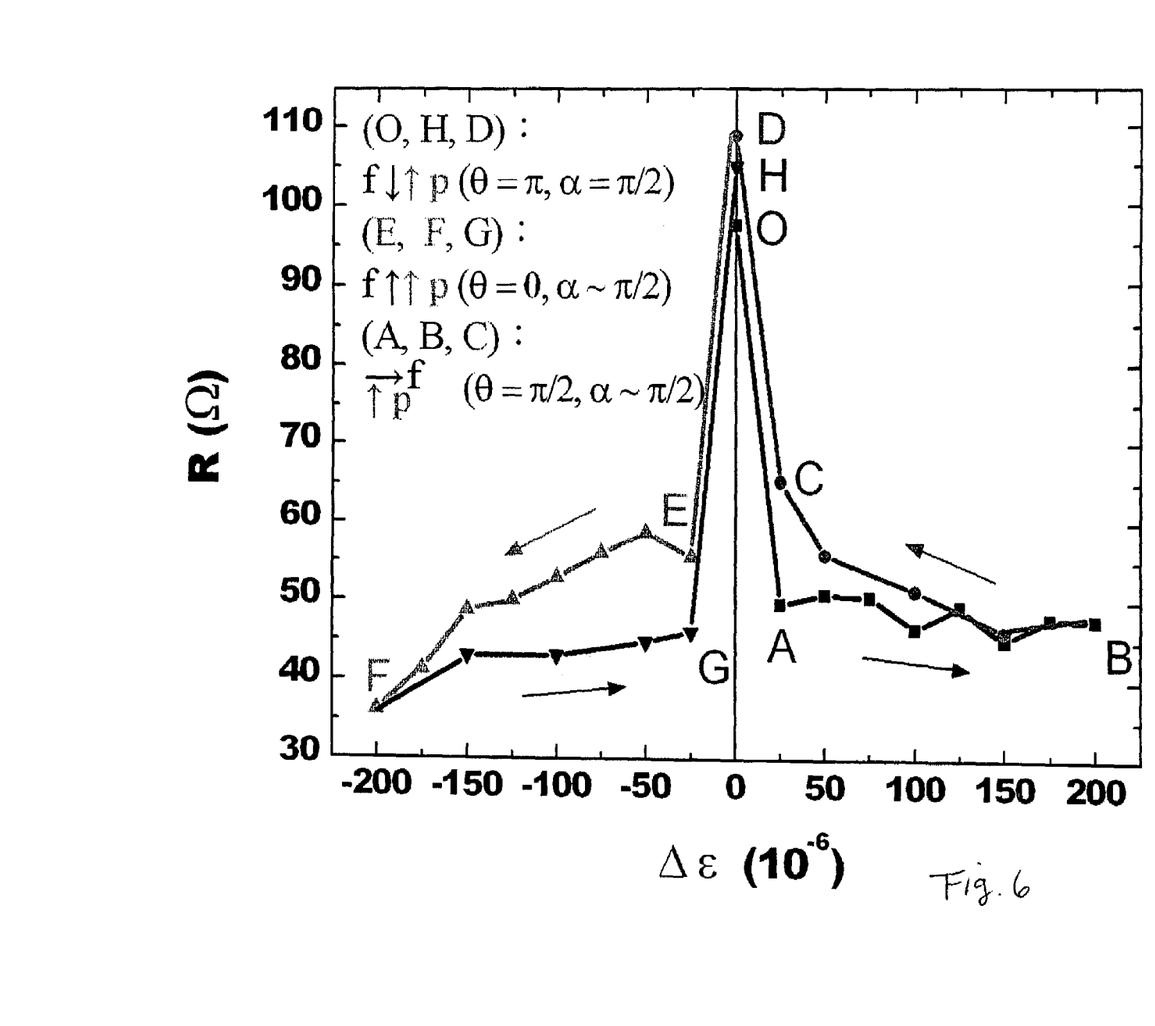
FIG. 6 is a graph illustrating a characteristic response curve of a magnetic tunnel junction (MTJ) in accordance with an exemplary disclosed embodiment.

FIG. 6 shows a typical R vs. strain plot of an example of an MTJ consistent with the present disclosure. A full straining cycle, in which the strain element 62 is subjected to a varying external force, is O→A→B→C→D→E→F→G→H. Preferably, during the straining cycle test, the room light is on. In FIG. 3, $\gamma_{max}$ is defined as $$\gamma_{max} \equiv |(1/R_i)(R_f - R_i)(1/\Delta\epsilon)|,$$

where |Δε|=25×10⁻⁶, and (i, f)≡(O, A), (D, C), (D, E) or (H, G).

The following features may be observed in FIG. 6. First, within the range −25×10⁻⁶≦Δε≦25×10⁻⁶, resistance decreases sharply. Moreover, at this low strain range, the resistance of the MTJ is a linear function of the applied strain, as displayed by the straight line of the response from point O to point A, from point C to point D, from point D to point E; and from point G to point H. Second, the plot in FIG. 6 is not completely symmetric with respect to the Δε=0 axis. In other words, the base line of the plot is slightly skewed such that, if the feature (A) is temporarily not considered, the slope of the base line is positive. Third, at points (O, H, D), the Co spin configuration in the free and the pinned layers 23 and 25 is schematically shown in FIG. 6 so that θ=π and α=π/2. Fourth, at points (A, B, C) θ=π/2 and α-π/2. Fifth, at points (E, F, G) θ=0 and α~π/2.

Regarding the first observation, an abrupt decrease of R from O to A is as large as 47Ω (or about a 48% decrease of $R_o$) in this experiment. Such a large decrease in the resistance, i.e. 47Ω or a 48% decrease, corresponding to such a small strain range, i.e. from zero to 25×10⁻⁶, as seen in the plot, is a feature that is highly suitable for an ultrasensitive strain gauge. A complete explanation of the mechanism of the extremely large piezoresistance effect of the MTJ as fabricated in FIG. 3 is not known at this time, but is believed to be attributed to two parts: one due to a non-magnetic origin, and the other due to a magnetic origin.

First, a non-magnetic origin is explained. It can be shown that the parameter T in Eq. (2) is expressed as:

$$T \propto \frac{E_F(\Delta E)}{dV_o^2} e^{-d/K}, \quad (3)$$

where $K=h/[8 m_e(\Delta E)]^{1/2}$, h is the Planck's constant, $m_e$ is the electron mass, $\Delta E \equiv V_o - E_F > 0$, $V_o$ is the AlO$_x$ barrier potential, $E_F$ is the Fermi level of the tunneling electron, and d is the thickness of the AlOx layer (layer 24) when Δε≠0. Then, if MTJ 19 is under a compressive stress (σ<0), the junction is so deformed in the x direction that d should become larger than $d_o$. That is $\Delta d=(d-d_o)/d_o>0$. As explained before, with the testing configuration in FIG. 5, it can be stated that v(Δε)=Δd, where v is Poisson's ratio of the MTJ. Also, in this case, the stress-strain elastic equation is modified as σ=−Y(Δε), where Y is the Young's modulus of the MTJ. Finally, from Eqs. (2) and (3), the strain effect on resistance (R) of the MTJ, if only the non-magnetic contribution is considered, should be dominated by an exponential factor as: R∝exp[d_o(1+vΔε)/K]. Therefore, it can be concluded that if Δε>0, R increases, and if Δε<0, R decreases.

The magnetic origin will next be discussed. Due to an inverse magnetostrictive effect, a magnetoelastic energy $E_\sigma$ can be expressed as:

$$E_\sigma = -\frac{3}{2}\lambda_s \sigma \cos^2\alpha = \frac{3}{2}\lambda_s Y(\Delta\epsilon)\cos^2\alpha. \quad (4)$$

Since the $\lambda_s$ value of the Co films is negative, from Eq. (4) it is concluded that if Δε>0 (i.e. σ<0), the easy axis (EA) of the spin of electrons, either in the free (layer 23) or the pinned layer (layer 25), tends to be aligned with the stress axis (i.e. α=0). However, if Δε<0 (i.e. σ>0), the corresponding EA tends to be perpendicular to the stress axis (i.e. α=π/2). Hence, if there is a non-zero strain acting on MTJ 19, there will be a first competition between $E_\sigma$ and $E_J$ on the Co spin of the pinned layer (layer 25), where $E_J$ is the antiferromagnetic exchange energy per unit volume, and a second competition between $E_\sigma$ and $E_i$ for the Co spin in the free layer, where $E_i$ is the induced anisotropy energy (by $\bar{h}$). The absolute value of the magnetostriction $\lambda_s$ of the free layer 23 should be preferably larger than 1×10⁻⁵, in order to facilitate the rotation of the spin of the free layer by external strain.

It is believed that the abrupt decrease of R, when going from point O to A or from point H to G, may be related to the TMR effect. Note that at point A, Δε=25×10⁻⁶, and at point G, Δε=−25×10⁻⁶. For the Co layer 23, the following data can be used: $\lambda_s$=−20×10⁻⁶ and Y=2.09×10¹¹ N/m². Then, at point A, $E_\sigma$=−157 J/m³ from Eq. (4). From $E_J=(H_{ex}M_s t)/A$, where $H_{ex}$=18, Oe is the exchange biasing field from IrMn¹⁰, $M_s$=1450 G is the magnetization of the Co film, $E_J$ can be calculated as 2610 J/m³. Hence, in the case of a small strain, like 25×10⁻⁶, the decrease of $E_\sigma$ cannot compensate for the increase of $E_J$. As a result, along O to A, the pinned spin $\bar{p}$ remains perpendicular to the stress axis. Also, since the pair-ordering effect in the Co layer 25 should not exist in principle, the induced $E_i$ must be smaller than |$E_\sigma$|. Thus, the free spin $\bar{f}$ of electrons in layer 23 is rotated toward the stress axis. Then, at point A there are two possible spin configurations in the MTJ 19: (I) $\theta=\pi/2$ and $\alpha=\pi/2$; (II) $\theta=3\pi/2$ and $\alpha=\pi/2$. The two configurations are equivalent. From FIG. 6, the fact is that the abrupt decrease of R from O to A is as large as 47Ω (or about a 48% decrease of $R_o$). Ideally, this amount of decrease should be $\Delta R=(1/T)[P^2/(1-P^2)]$, which is about half of that, $\delta R=(2/T)[P^2/(1-P^4)]$, found in a TMR experiment, where $H_E$ is used to flip the free spin $\vec{f}$ from the $\theta=\pi$ to the $\theta=0$ state, while leaving $\bar{p}$ pinned. As to point G, $E_o=+157$ J/m³>0, which means that a is equal to $\pi/2$ (or $3\pi/2$), as neither $E_o$ nor $E_J$ favors the rotation of $\bar{p}$. Moreover, since $R_H=R_G+60\Omega$, it is believed that at point G, the spin configuration should be $\theta=0$ and $\alpha=\pi/2$ instead of $\theta=\pi$ and $\alpha=\pi/2$. Therefore, the abnormally large piezoresistance phenomenon in the low-strain range is believed to be largely due to the TMR effect, the magnetic origin.

Regarding the second observation, the breaking of the left-right symmetry of the R vs. Δε plot may be possibly due to the piezoresistance effect of the non-magnetic origin. As discussed before, under this non-magnetic mechanism, $R \propto \exp[d_o v(\Delta\epsilon)/K]$. This explains why in FIG. 6 $R_A>R_G$, $R_B>R_F$, and $R_C>R_E$, which may indicate a symmetry breaking property.

Figure 7:
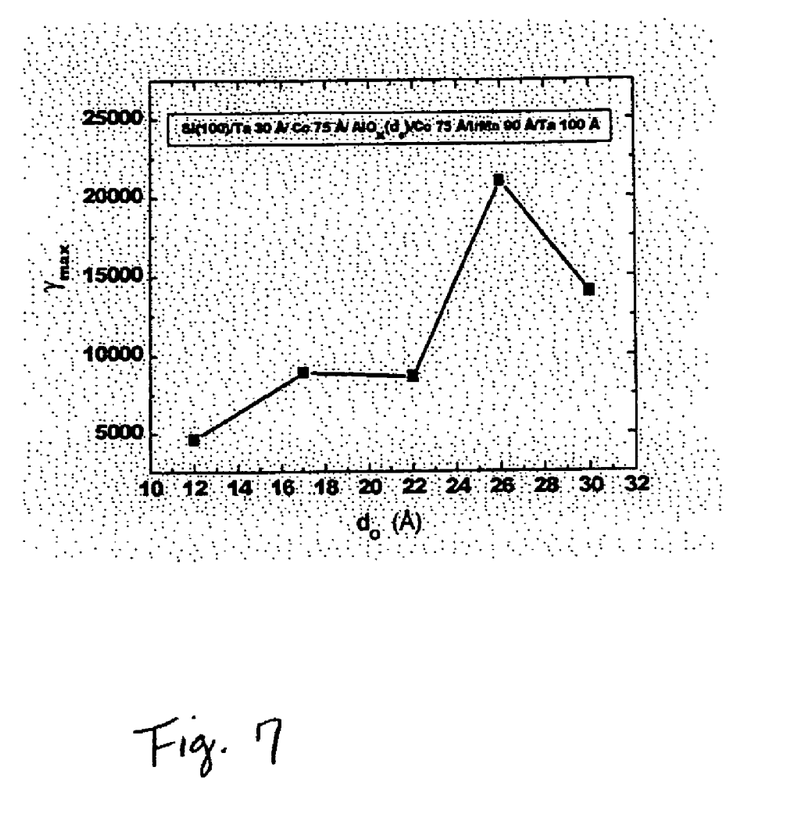
FIG. 7 is a graph illustrating a relationship between an absolute value of the maximum gauge factor ($\gamma_{max}$) of a magnetic tunnel junction (MTJ) and a layer thickness of AlOx ($d_o$) in accordance with an exemplary disclosed embodiment.

FIG. 7 shows a $\gamma_{max}$ versus $d_o$ plot for the series of Co/AlO$_x$ ($d_o$)/Co/IrMn junctions consistent with the present disclosure. As previously stated, these MTJs can be used in an ultra-sensitive strain gauge having a very high $\gamma_{max}$ as a sensor, especially in the low-strain range. The advantages include (i) that $\gamma_{max}$ ranges from 5000 to 20000, and (ii) that the response curve between state i and state f is linear. The combination of ultra-sensitivity to low strain and a linear response is highly suitable for application of these MTJs as a strain gauge. However, there may be a disadvantage to using such MTJ gauges. Since the R versus Δε plot is nearly symmetric, it may be difficult, in the present condition, to distinguish the signs of Δε just from the response signal ΔR. asym exists, and based on the asym in diff portion, dir of strain can be distinguished and determined.

Fortunately, the asymmetry factor of the non-magnetic origin may be taken into consideration to distinguish the direction of strain. Thus, an MTJ gauge having a very large gauge factor may be fabricated using the above disclosed MTJ.

It will be apparent to those skilled in the art that various modifications and variations can be made to the disclosed materials and processes without departing from the scope of the invention. Other embodiments of the present disclosure will be apparent to those skilled in the art from consideration of the specification and practice of the present disclosure. It is intended that the specification and examples be considered as exemplary only, with a true scope of the present disclosure being indicated by the following claims and their equivalents.

What is claimed is:

1. A strain sensor, comprising:
    a substrate;
    a sensing layer including cobalt provided on the substrate;
    a first electrode coupled to the sensing layer;
    a tunnel layer including aluminum oxide provided on the sensing layer;
    a pinned layer including cobalt provided on the tunnel layer;
    an exchange biasing layer on the pinned layer; and
    a second electrode coupled to the exchange biasing layer,
    wherein, over a range of values of strain applied to the sensor, a resistance of the strain sensor is a linear and even function of the strain, and the resistance of the strain sensor decreases by at least 48% for a range of strain between 0 to $25 \times 10^{-6}$.

2. The strain sensor according to claim 1, wherein the sensing layer, the tunnel layer, and the pinned layer constitute a magnetic tunnel junction.

3. The strain sensor according to claim 1, wherein the range of values of strain is substantially equal to $\pm 25 \times 10^{-6}$.

4. The strain sensor according to claim 1, wherein the strain sensor has an associated gauge factor, the gauge factor being greater than 5000 and less than 20,000.

5. The strain sensor according to claim 1, wherein the thickness of the tunnel layer is greater than 12 Å.

6. The strain sensor according to claim 1, wherein the tunnel layer includes an amorphous material.

7. The strain sensor according to claim 1, wherein a thickness of the pinned layer does not exceed 300 Å.

8. The strain sensor according to claim 1, wherein a thickness of the sensing layer does not exceed 300 Å.

9. The strain sensor according to claim 1, further comprising a conductive seed layer between the substrate and the sensing layer and a conductive protection layer on the exchange biasing layer.

10. The strain sensor according to claim 9, further comprising an IrMn layer as the exchange biasing layer.

11. The strain gauge according to claim 1, wherein the substrate includes Si or surface oxidized Si.

* * * * *